Feb. 17, 1942. V. F. SLEZAK 2,273,291
TICKET SCALE
Filed March 6, 1940 6 Sheets-Sheet 1
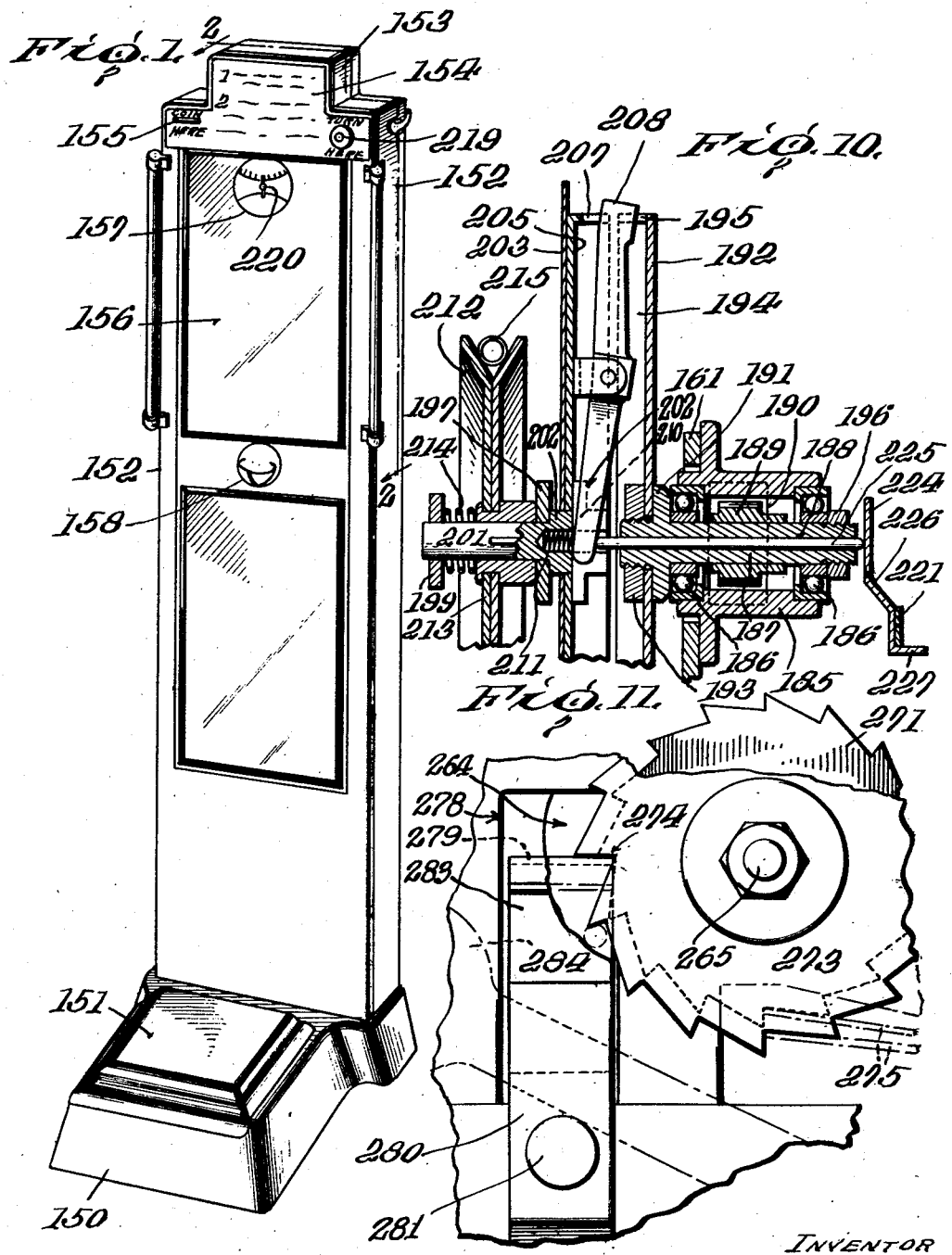

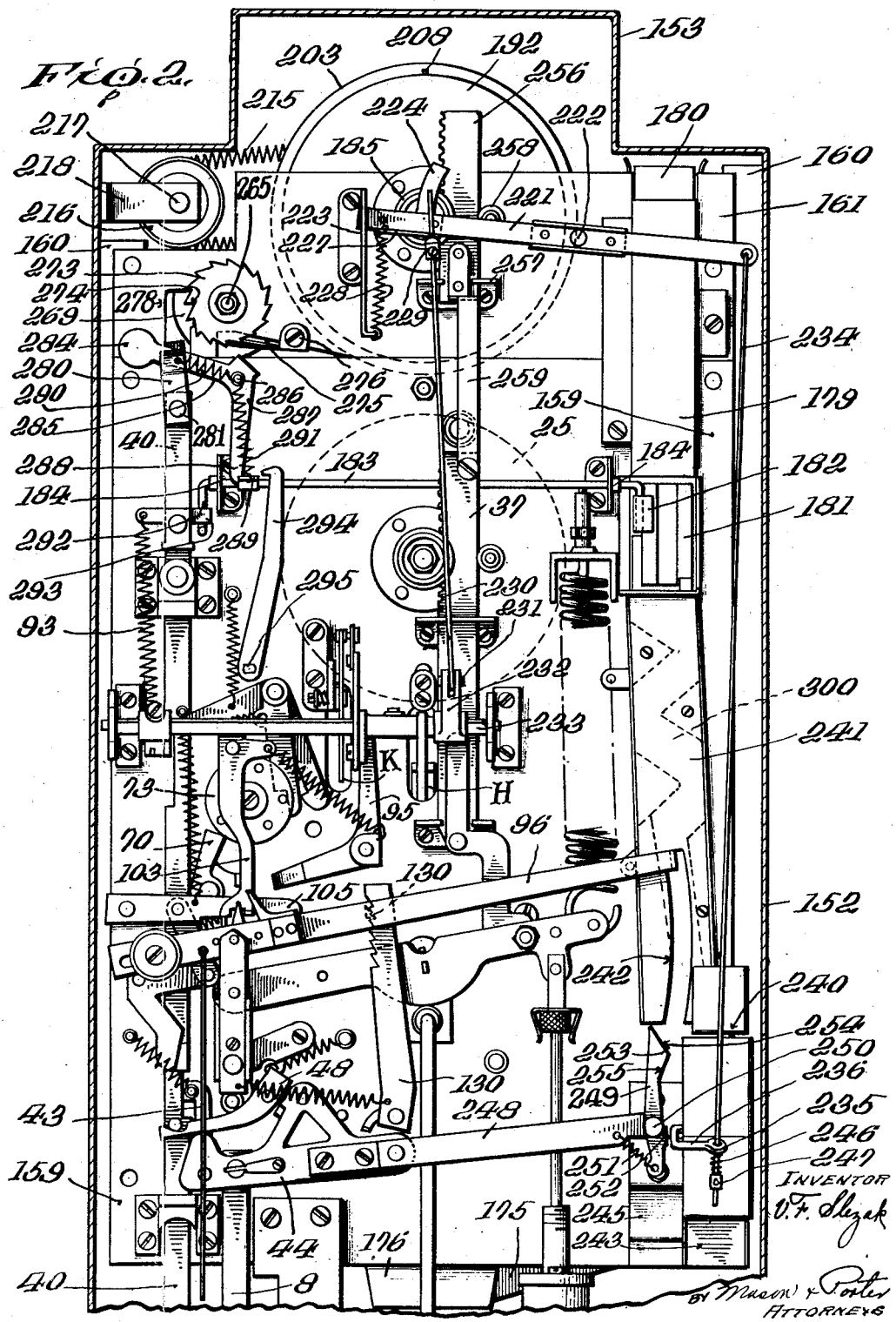

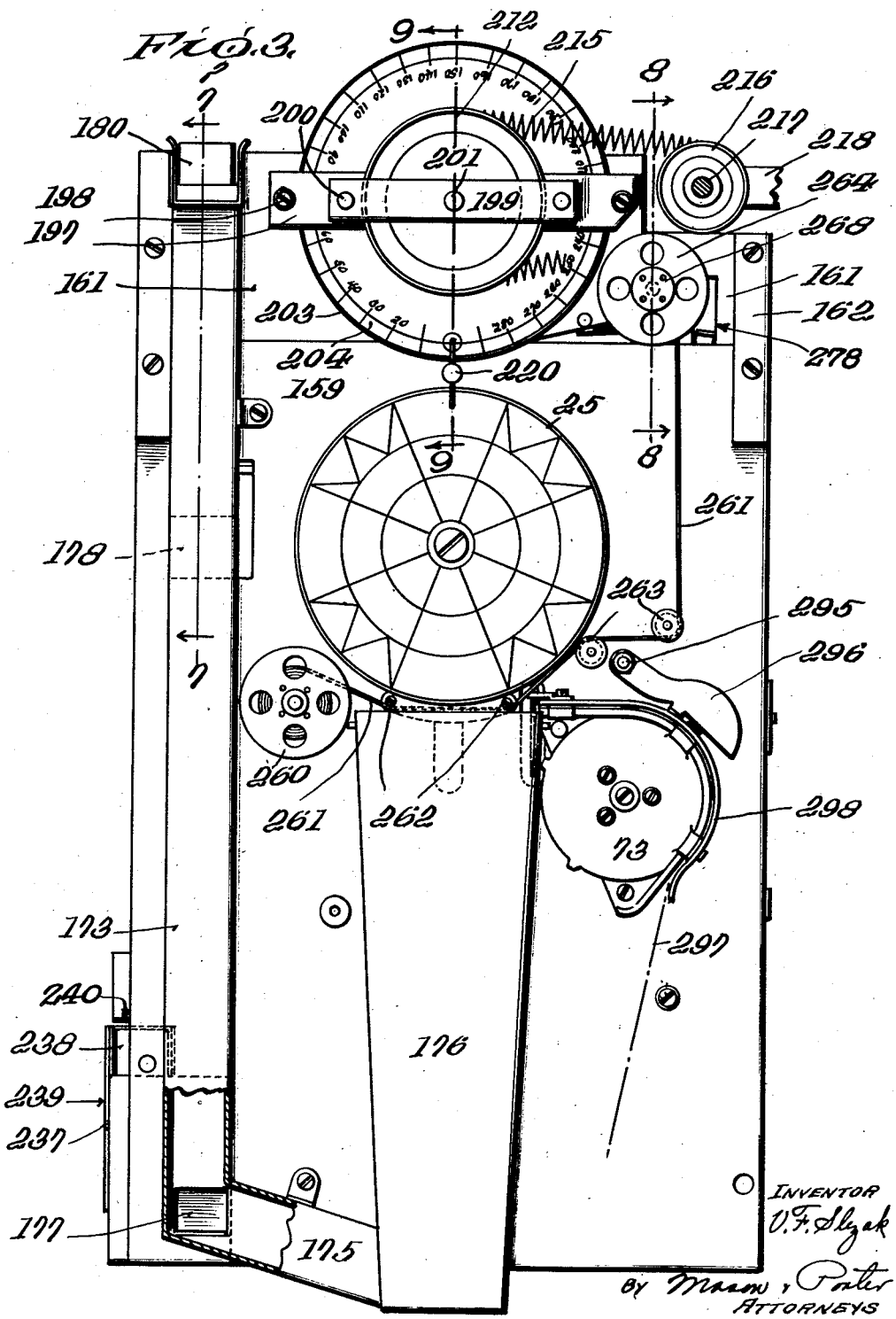

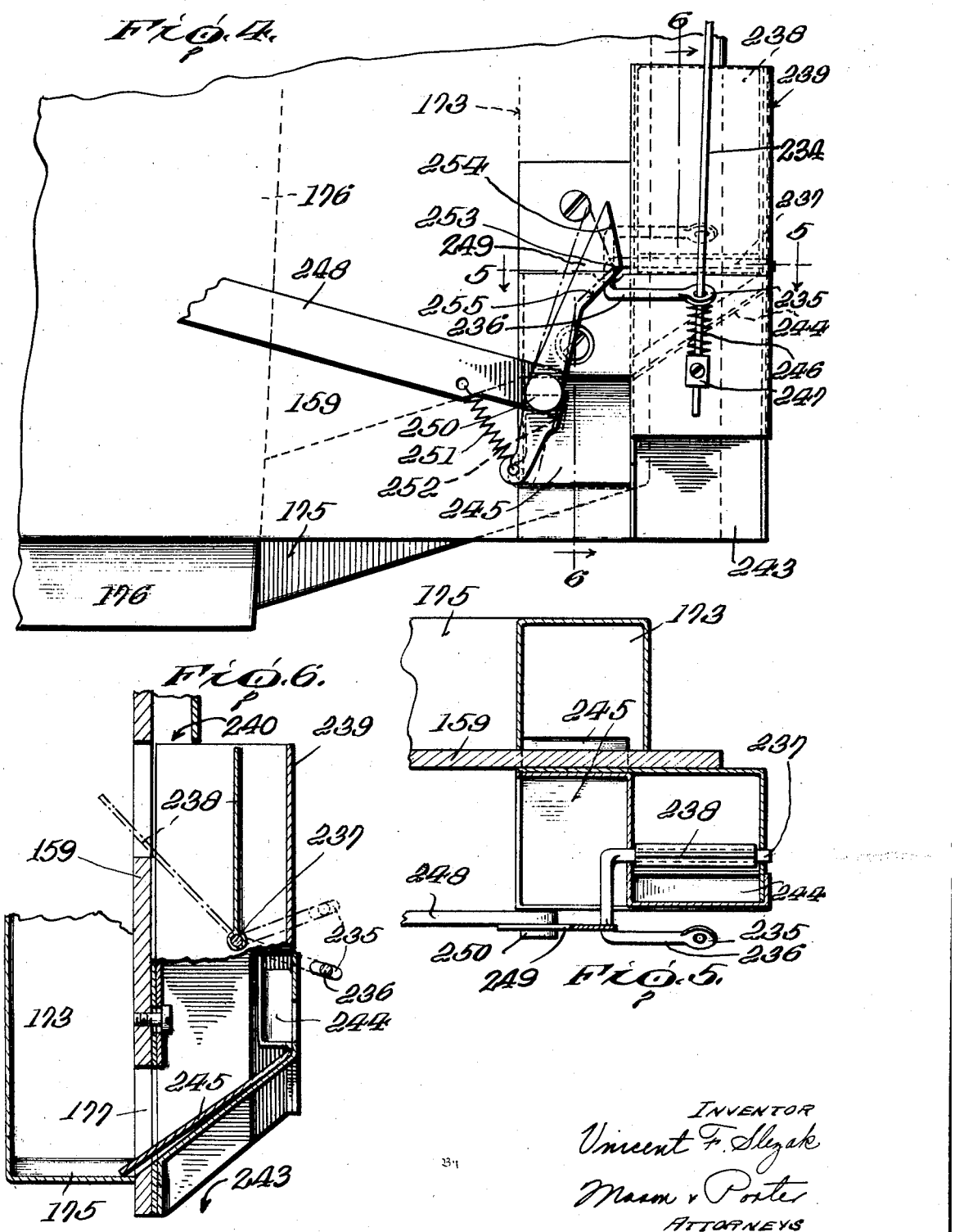

Feb. 17, 1942.  V. F. SLEZAK  2,273,291
TICKET SCALE
Filed March 6, 1940   6 Sheets-Sheet 5
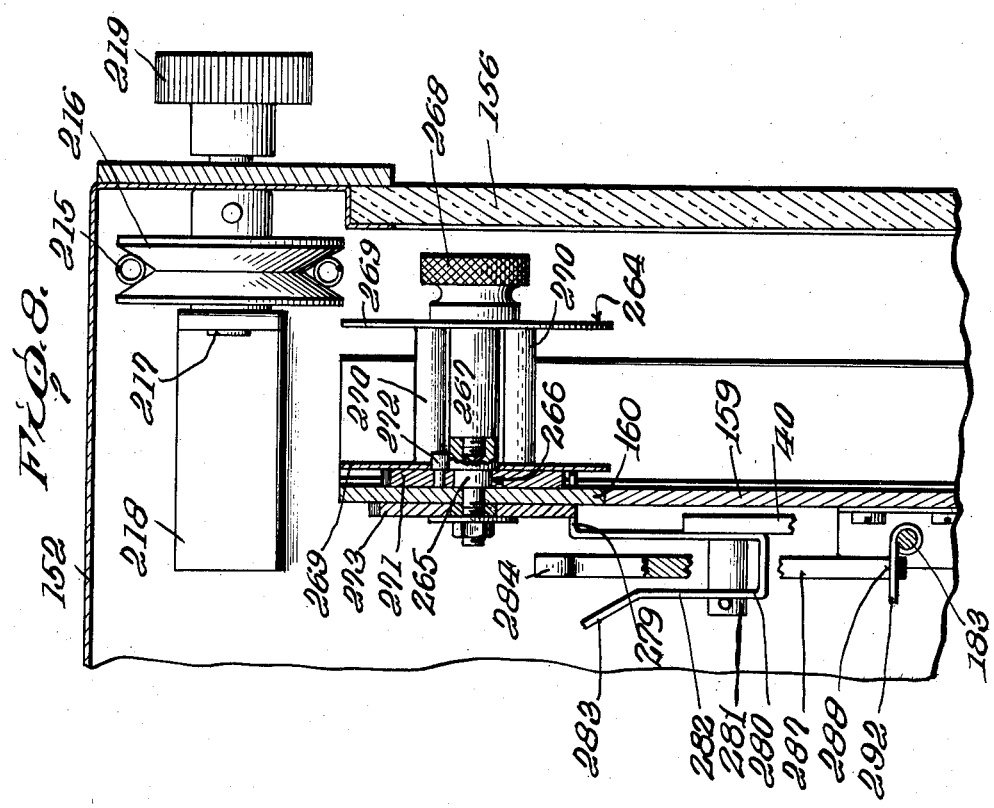
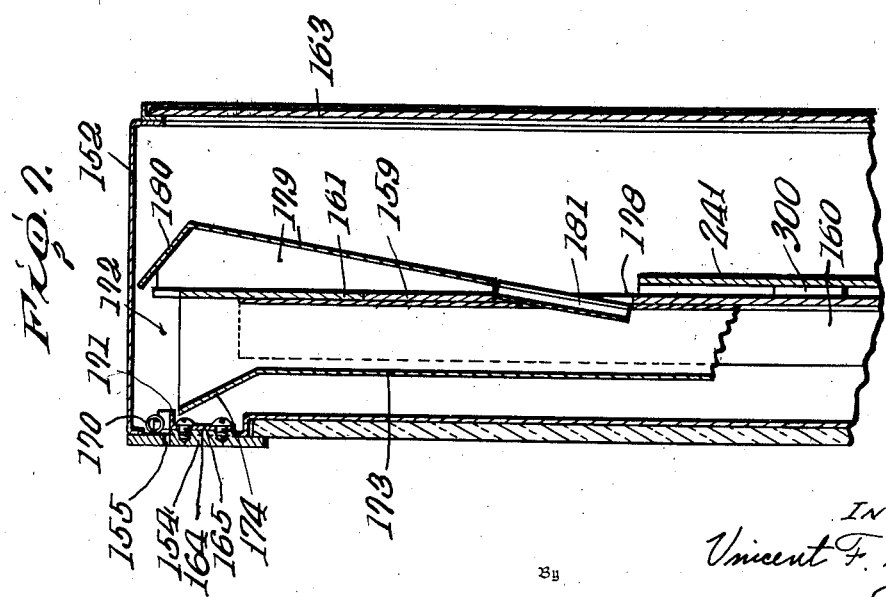
INVENTOR
Vincent F. Slezak
Mason & Porter
ATTORNEYS

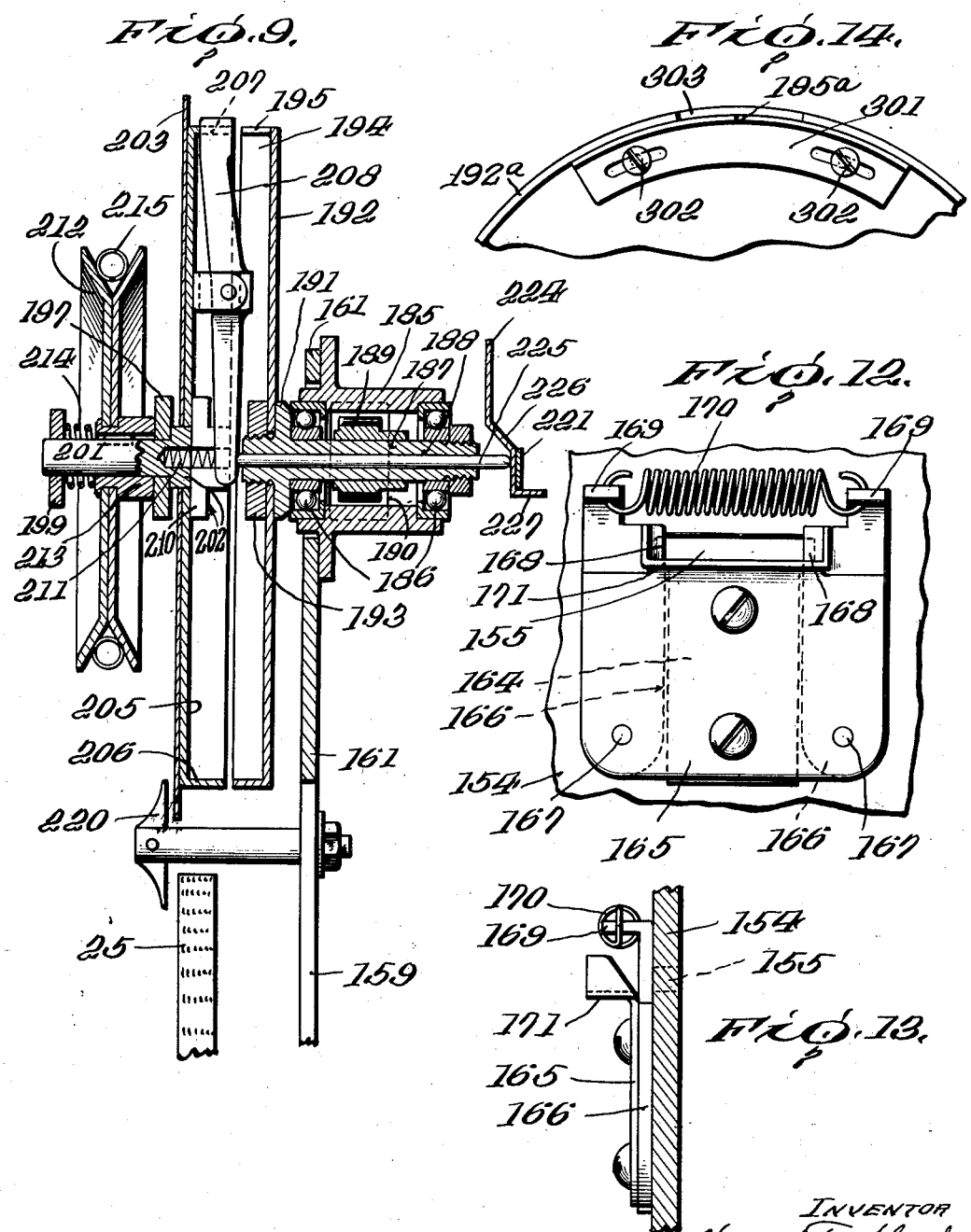

Patented Feb. 17, 1942

2,273,291

UNITED STATES PATENT OFFICE 2,273,291

TICKET SCALE

Vincent F. Slezak, Chicago, Ill.

Application March 6, 1940, Serial No. 322,618

12 Claims. (Cl. 194—47)

The invention relates generally to coin controlled weighing scales wherein is included means for dispensing tickets having printed thereon weights of the persons being weighed, and it primarily seeks to provide certain new and useful improvements in such scales including means whereby a person seeking to be weighed can record a guess as to his or her weight and then insert a coin to control actuation of the ticket printing and cutting mechanism and have that coin returned together with the dispensed ticket if the guess has been accurate.

A ticket scale of the type stated is disclosed in United States Letters Patent 1,969,466 issued to Henry Koch on August 7, 1934, and in its more detailed nature the present invention seeks to provide novel guess recording and coin returning mechanism mountable as an attachment to the machine structure disclosed in that patent.

In its more detailed nature, the invention resides in the provision of a novel coin diverter effective, when a weight has been accurately guessed, to intercept the inserted coin and direct it into the receptacle into which the ticket having the weight printed thereon is dispensed, a weight guess recording rotor manually actuated by the person being weighed to indicate the weight guess made and which carries a movement obstructing element selectively positioned during the weight guess recording function and normally effective to obstruct movement of diverter actuating devices, and a rotor opposed to the recording disk and movable with the weighing devices and having a recess for receiving said element to remove it from its obstructing position only when moved into registering relation to said element by application of a correctly guessed weight.

Another object of the invention is to provide scale apparatus of the character stated in which the diverter actuating devices are spring actuated and are operable only after insertion of a coin.

Another object of the invention is to provide a scale of the character stated in which means is included for clearing or delivering up paper or similar bits of debris which might be inserted into the coin slot by pranksters and which might otherwise tend to jam the scale.

Another object of the invention is to provide a scale of the character stated in which is included a novel inking ribbon equipment and means for feeding the ribbon a limited distance once for a definite plurality of weighing and ticket issuing operations so as to assure proper inking of the tickets without wastage of ribbon.

Another object of the invention is to provide a scale of the character stated in which there is included a member movable upon depression of the scale platform for storing energy effective to actuate ticket printing and cutting devices, and means for returning an inserted coin whenever the member has not moved sufficiently to properly store energy or whenever the supply of ticket material is exhausted.

With the above and other objects in view that will hereinafter appear, the nature of the invention will be more fully understood by following the detailed description, the appended claims, and the several views illustrated in the accompanying drawings.

Figure 1 is a perspective view of a scale structure embodying the invention.

Figure 2 is a vertical cross-sectional view of the upper portion of the scale casing, the section being taken on the line 2—2 on Figure 1, the weighing mechanisms being illustrated in rear face view.

Figure 3 is a front face view of the panel structure included in Figure 2.

Figure 4 is a fragmentary face view illustrating the normal position of the coin diverter vane structure.

Figure 5 is a horizontal section taken on the line 5—5 on Figure 4.

Figure 6 is a vertical cross-section taken on the line 6—6 on Figure 4.

Figure 7 is a vertical cross-section taken on the line 7—7 on Figure 3.

Figure 8 is a vertical cross-section taken on the line 8—8 on Figure 3.

Figure 9 is a vertical cross-section taken through the axis of the rotors, that is on the line 9—9 on Figure 3, said rotors being shown in a kerf aligned position prior to insertion of a coin.

Figure 10 is a view similar to Figure 9 showing the position of the parts following insertion of a coin.

Figure 11 is an enlarged fragmentary face view illustrating the engagement of the pawl with the ribbon feeding ratchet wheel.

Figure 12 is a rear face view illustrating the coin slot equipment.

Figure 13 is an edge view of the coin slot restricting levers shown in Figure 12.

Figure 14 is a fragmentary face view illustrating a means for adjusting the position of a rotor flange kerf.

In scales of the character hereinbefore referred to, when a person steps on the load platform, a spring weighing mechanism within the column acts to rotate a weight indicating dial having weight indicating characters which, preferably, are not visible from the exterior of the machine and power storing devices are actuated to store power for operating the ticket printing mechanism. A coin may then be deposited to release the ticket printing mechanism, whereupon a weight indicating ticket is printed and delivered.

The automatic mechanism of the scale is so constructed and arranged that the downward movement of the load platform which occurs when the platform is loaded by a person stepping thereon acts to move a power storing plunger upward to wind or store energy in the machine, and this movement of the plunger simultaneously feeds a ticket portion into position for being printed and applies tension to the ticket printing and cut-off mechanism. Thereafter, upon deposit of a coin the applied tension actuates the ticket printing and cut-off mechanism and then releases the plunger so that it may move downward to initial position, during which downward movement the plunger resets the ticket printing and cut-off mechanism for a successive operation.

In the example of embodiment of the invention herein disclosed, the improved scale includes a base 150 on which is mounted a depressible platform 151 and from which a columnar casing 152 extends vertically. The casing includes a central crown extension 153 and carries a face plate 154 upon which instructions governing operation of the scale are applied. A coin slot 155 is provided at the left-hand side of the face plate. See Figure 1. The casing 152 also includes an ornamental face panel 156 having a window 157 formed therein through which dials of the inner mechanism of the scale can be viewed, and a coin and ticket delivery receptacle 158.

The weighing mechanism within the scale casing is substantially the same or fully equivalent to the scale mechanism disclosed in United States Letters Patent to Koch 1,969,466, issued August 7, 1934, and the parts of this mechanism herein disclosed and referred to are given the same reference characters applied to them in the said patent, so as to facilitate a clear understanding of the construction and operation of these parts.

Since the scale parts are disclosed in detail in the patent referred to, full detailed description of the construction and operation of these parts is though to be unnecessary in the present disclosure, and in order to facilitate this disclosure, the parts disclosed in the patent will be described by way of operation alone.

When a person steps upon the platform 151 of the scale, the following things happen. The winding rod 8 is moved upwardly and imparts a lifting movement to the lever 44, and the pawl 43 on said lever lifts the main power storing plunger 40. Upward movement of the rod 8 and the lever 44 also serves to release the latch 130 which is normally effective to prevent depression of the coin depressed released lever 96. See Figure 2.

Should a person step off from the platform 151 without depositing a coin, the energy stored in the spring 93 by upward movement of the plunger 40 is retained by a latch pawl 48 which engages the lever 44. This latch pawl is released upon each normal descent of the plunger 40. The latch 130 previously referred to prevents actuation of the scale parts by a coin until a person has stepped onto the platform 151. See Figure 2.

Upward movement of the plunger 40 also actuates the ticket feed pawl 70 carried by the plunger 40, by reason of engagement of said pawl with one or another of the pins carried by the ticket feed wheel 73. The upward movement of the plunger 40 also loads the ticket cut-off knife and the ticket printing hammer actuating spring 93, these parts normally being held inactive by a latch 95. The cut-off knife and printing hammer equipments are generally designated K and H respectively.

Depression of the platform 151 also causes the rack 37 to move downwardly and impart weight indicating rotation to the printing wheel 25 but, as previously stated, the person standing on the platform cannot see the weight indication. See Figures 1 and 3.

When a coin is deposited in the slot 155 by a person standing on the platform 151, the coin, passing through the coin slotway hereinafter to be described, engages and depresses the free end of the release lever 96. Depression of this lever serves to move the latch member 103 to the right, as viewed in Figure 2, thus freeing the trip lever 105 and permitting it to swing upwardly and impart a hammer blow effective to release the latch or trigger 95 serving to prevent actuation of the knife and hammer equipments K and H, and thus frees the energy stored in the spring 93 and brings about an actuation of the knife and hammer equipments effective to print and sever a ticket from the continuous strip of ticket material. Upward movement of the lever 105 also serves to release the pawl 43 and permit the plunger 40 to descend and reset the hammer H and ticket cut-off knife K equipments. See Figure 2.

The panel on which the weighing mechanism is mounted is herein designated 159 and is secured at its lateral edges to angular frame members 160 which are in turn secured to the side walls of the casing column 152. A similar panel is disclosed in the patent hereinbefore referred to, but in the present invention this panel includes an upward extension 161 which is secured upon the upper edge of the panel 159 by bracket strips 162. A removable rear panel or door 163 is provided, and through this door access can be had to the mechanism within the casing.

At the inside face and just beneath the coin slot 155, the face plate 154 is provided with a mounting boss 164 to which is affixed a mounting plate 165. The lateral edges of the plate 165 extend beyond the boss 164 and cooperate with the opposing rear wall portions of the face plate 154 in providing clearances in which coin pitching levers 166 are mounted. One such lever is mounted at each side of the boss and is pivoted at its lower end, as at 167, on the plate 165. Each lever 166 extends upwardly and traverses the coin slot 155, as at 168, extending inwardly of each end of said slot so as to restrict the coin passage therethrough. The boss 164 serves as a limiting stop to limit movement of the levers 166 toward each other and thereby determines the extent to which said levers restrict the passage of coins through said slot. The levers 166 terminate at their upper ends in horizontally disposed ears 169, and a coil spring 170 is secured between these ears and serves to yieldably hold the levers in coin slot restricting relation. The plate 165 includes a horizontal, inwardly extended supporting ledge portion 171 which serves to direct horizontally coins inserted through the coin slot.

Coins inserted through the slot 155 are pitched by the levers 166 across a wide gap 172 intervening the coin slot and the panel extension 161. See Figure 7. Within said gap and in register with the coin slot, a debris trapping and coin returning chute 173 is secured to the front face of the panel 159 and the extension 161 thereof. This chute includes a forwardly extended lip 174 which extends beneath the horizontal plate portion 171 in the manner best illustrated in Figure 7. At its lower end, the chute 173 inclines laterally and downwardly, as at 175, and delivers into the lower end of the ticket chute 176 also carried by the panel 159. Both chutes 175 and 176 deliver through the front panel of the casing 152 into the receptacle 158 hereinbefore referred to. See Figure 3.

It will also be observed by reference to Figure 3 that the panel 159 is provided with an opening 177 at the juncture of the vertical and inclined portions of the chute 173 and 175, and the purpose of this opening will become apparent as the description progresses. A similar opening 178 is provided nearer the upper end of the chute 173 and just below the coin receiver chute 179 secured to the rear face of the panel 159 and its extension 161. See Figure 7. The upper end wall of the chute 179 is angled rearwardly and downwardly above the panel extension 161, as at 180. For the purpose of diverting coins pitched from the coin slot 155 into the receiving chute 179 and immediately below the chute 179, there is provided a swingably mounted chute section 181. The chute section 181 is effective at times to return coins to a person attempting to operate the scale, and in accomplishing this function, such coins received in the chute 179 are diverted by the chute section 181 through the panel opening 178 and into the coin return chute 173. The specific functioning of the chute section 181 will be described in detail hereinafter. The chute section is secured at 182 on the rod 183 rockably mounted in bearings 184 affixed to the rear face of the panel 159. See Figure 2.

A bearing hub 185 is secured to the rear face of the panel 159 and carries anti-friction bearings 186 in which a shaft 187 is rotatably mounted. The shaft 187 is provided with an axial bore 188 and carries a pinion 189 within the bearing hub. The hub is cut away, as at 190, at one side to render the pinion engageable by an actuating rack later to be referred to. See Figure 9.

A head 191 is formed on the front end of the shaft 187, and against this head a flange disk or rotor 192 is clamped by a nut 193. The flange 194 of the rotor is provided with a receiving recess or kerf 195 at one point only in the circumference thereof. The shaft 187 is also threaded at its rear end to receive a securing nut 196.

A mounting bar 197 is secured at 198 in spaced relation to the panel extension 161, and a second mounting bar 199 is similarly secured, as at 200, to the bar 197. The bars 197 and 200 rotatably support a shaft 201 in axial alignment with the shaft 187 hereinbefore referred to. The shaft 201 carries an enlarged head 202 behind the bar 197. A dial plate 203 having weight indicating graduations 204 applied to its front face is secured to a flanged disk or rotor 205 similar in construction to the rotor hereinbefore described, and having its horizontal flange 206 equipped at one point only with a recess or kerf 207. The rotor and plate 205, 203 are carried by the shaft head 202.

The recess or kerf 207 in the rotor 205 is adapted normally to receive the outer end of a bar 208 pivoted intermediate its ends, as at 209, on the rotor 205. The inner end of the bar is received in a cross-slot 210 formed in the head 202, and a compression spring 211 mounted in the receiving socket formed in the shaft 201 normally presses the inner end of the lever 208 rearwardly so as to retain the outer end of the bar in the disk kerf 207, in the manner illustrated in Figure 9.

A large grooved pulley 212 is spline mounted on the shaft 201 and includes a hub 213 which is pressed into frictional contact with the bar 197 by a compression spring 214 interposed between the front face of the pulley and the rear face of the bar 199. A coil spring belt 215 passes over the pulley 212 and over a small pulley 216 secured upon the shaft 217 rotatably supported in the face plate 154 and in the bracket 218 secured within the casing column, in the manner best illustrated in Figures 2 and 8. A knob 219 is secured to the shaft 217 outside the casing, so that it can be manipulated by a person seeking to use the scale to impart rotation to the shaft 217, and through the belt 215 to the pulley 212 and the shaft 201 on which it is mounted. A pointer 220 is fixed to the panel 159 beneath the dial plate 203 and this pointer overlies the dial plate 203 and also the printing wheel 25 so as to indicate positions of said dial and wheel. By turning the knob 219, a user of the scale can impart rotation to the rotor and dial 205, 203 to record a guess of his weight, and to thus position the rotor kerf 207 and bar 208 in accordance with the weight guess.

A lever 221 is pivoted intermediate its ends, as at 222, on the extension 161 of the panel 159. One end of the lever is swingable in a confining slot in a bracket 223 secured to the panel extension 161, as illustrated in Figure 2, and this end of the lever carries an arcuate sector 224 in registry with a plunger 225 which is reciprocable in the axial bore 188 of the shaft 187 and which projects rearwardly from said bore in the manner illustrated in Figures 9 and 10 of the drawings. The sector includes a plunger displacing cam portion 226 and a horizontal flange portion 227 extending rearwardly beneath the lever 221. A tension spring 228 is secured to the bracket 223 and to the flange 227 and constantly tends to move the lever 221 in a direction for depressing the sector 224 and causing the cam portion thereof to force the plunger 225 forwardly. This movement of the lever is normally prevented by an abutment 229 adjustably affixed to a rod 230 extended upwardly through a receiving aperture in the flange 227 and pivotally connected, as at 231, at its lower end with the crank arm 232 secured to the printing hammer and cut-off knife carrying shaft hereinafter designated 233. The abutment and rod equipment 229, 230 prevents lowering of the lever sector 224 until the control mechanisms are properly released by the depositing of a coin. The rod and abutment equipments 229, 230 also serve to reset the lever 221 and the sector 224 carried thereby to the normal position illustrated in Figures 2 and 9 upon each resetting of the printing hammer H and the ticket cut-off knife K, as hereinbefore described.

At its other end, the lever 221 is connected with a lift rod 234, and the lower end of this rod passes through an eye 235 in a crank extension 236 of the rock shaft 237. The rock shaft 237 has a coin diverting vane 238 affixed thereto, and the shaft and vane equipments are mounted in a chute member 239 which receives coins, as at 240, from the fixed coin chute section 241 mounted in vertical alignment with the chute section 179 and having an arcuate slotway 242 therein for receiving the end of the coin depressed release lever 96 which is bent at a right angle with relation to the main body of said lever. The end of the lever 96 thus projects into the coin slotway in position for being engaged and depressed by coins traveling downwardly therethrough. See Figures 2 and 4.

The chute structure 230 includes a normal coin discharge passage 243 and a lateral diverter wall or bottom 244 which extends downwardly and to the left as viewed in Figure 4 and serves at times to divert coins onto a forwardly and downwardly inclined wall 245 leading through the panel opening 177 into the coin return chute hereinbefore described. See Figures 5 and 6.

A compression spring 246 is interposed between the crank eye 235 and an abutment 247 adjustably secured upon the lower end of the lift rod 234. Thus, each time the rod 234 is lifted by the lever 221, the crank 236 will be lifted to move the diverter vane 238 from its normal vertical position to a tilted position for intercepting coins and diverting them from the normal discharge 243 into the diverter equipments 244 and 245 and the return chute portion 175.

The lift lever 44 is provided with an extension 248, and a cam finger 249 is pivotally mounted, as at 250, at the end of this extension. Spring means 251 serves to normally hold the cam finger in the position illustrated in Figure 4 of the drawings, an abutment 252 serves to define this normal position by engagement with the outer end of the extension 248, and the finger includes a cam nose portion 253 having an upper inclined cam portion 254 and a lower oppositely inclined cam portion 255. Each time the lift lever extension 248 is moved downwardly after a scale operation to its normal position, illustrated in Figure 4 of the drawings, the cam surface 255 thereof serves to return the crank 236 to a position for holding the diverter vane 238 vertically. Said cam surface likewise yieldably holds the vane in this normal position, but yields to permit movement of the vane to its tilted or coin diverting position whenever the rod 234 is lifted upwardly. Whenever the rod is so lifted and the crank 236 is lifted to tilt the vane, the upper cam surface 254 serves to yieldably hold the vane in the tilted position, and prevents rebounding of the vane from its coin diverting position.

A rack member 256 meshes with the pinion 189 on the shaft 187 and is slidable in a bracket 257 secured to the panel extension 161. The rack 256 is held against the pinion by a roller 258 fixedly supported on the panel extension, and this rack moves simultaneously with the rack 37 of the weighing mechanism hereinbefore referred to, because of being connected with the rack 37 through the medium of a thrust link 259. See Figure 2.

The invention includes a novel ribbon mounting and novel means for presenting fresh portions of the ribbon to the ticket printing mechanisms at relatively infrequent intervals. This equipment includes a frictionally mounted pay-off spool 260 on which one end of an inked ribbon 261 is wound. The paid-off end of the ribbon passes over guides 262 spaced beneath the printing wheel 25 and over suitably positioned guides 263 which direct it to the take-up or feed spool 264. The spool 264 is mounted on a shaft 265 freely rotatably mounted, as at 266, in the panel extension 161. In order to facilitate mounting and removal of the spool, the shaft includes a thread-ably mounted removable section 267 equipped with a knurled turning head 268 which also serves as a spool retainer. The spool 264 includes face plates 269 joined in spaced relation by distance rods 270, and a ratchet wheel 271 is connected in driving relation with the spool through the medium of a driving lug 272 which extends from the wheel into a receiving aperture in one of the spool plates. A larger diameter ratchet wheel 273 is freely rotatable about the shaft 265, and it will be observed by reference to Figures 8 and 11 that the root of each ratchet tooth save one on the wheel 273 is spaced the same or a slightly greater distance from the wheel axis than the peripheral extremities of the teeth on the smaller wheel 271. One tooth of the wheel 273 is made deeper than the remaining teeth thereon, and this deep tooth is designated 274. The purpose of this deep tooth will soon be described. Spring check pawls 275 are secured, as at 276, to the panel extension 161 in position for engaging and preventing retrograde movement of both of the ratchet wheels 271 and 273.

A vertical opening 278 is formed in the panel extension 161 to receive and accommodate movement of a horizontal extension 279 from the actuator pawl 280 which is pivotally mounted, as at 281, at the upper end of the plunger 40. See Figures 8 and 11. The pawl 280 includes a rearwardly extended leg 282 disposed in parallel relation to the main body of the pawl and terminating at its upper end in an upward and rearward flare 283. The pawl portion 279 is constantly urged toward the ratchet wheels by a tension spring, and it will be obvious that each time the plunger 40 is moved to an upper extremity of its range of movement, the pawl portion 279 will engage and impart a step movement to the ratchet wheel 273. Only when the pawl portion 279 enters the deep notch 274 in the ratchet wheel 273, however, will said pawl portion be permitted to move inwardly far enough to engage and impart a step movement to the ratchet wheel 271, and thus a step movement will be imparted to said ratchet wheel 271 and to the ribbon once for each sixteen reciprocations of the plunger 40. Obviously, the relation of the plunger reciprocations and the ribbon feed steps can be varied at will by altering the relation of the teeth on the respective ratchet wheels.

The spaced leg and body portions 282, 280 of the pawl straddle a weighted, generally horizontal arm 284 of a bell crank lever 285 pivoted, as at 286, on the panel 159. The other generally vertical leg 287 of the bell crank lever is equipped with a latch shoulder 288 engageable over a latch arm 289 extended rearwardly from the rock shaft 183 hereinbefore referred to.

The tension spring by which the pawl 280 is yieldably urged toward the ratchet wheels is designated 290 and is secured to the pawl and to the pin which forms the pivotal mounting for the bell crank lever 285. A tension spring 291 is connected to the same pin and to the free end of the latch arm 289, and constantly urges the shaft 183 in the direction for presenting the coin chute section 181 in its coin chute aligned position, that is in position for aligning with and forming a through passage for coins with the chute portion 179 and the chute portion 241. See Figures 2 and 7. A crank arm 292 is secured to the shaft 183 and is engaged by a lug 293 on the plunger 40 each time the plunger moves downwardly to rock the shaft 183 and position the coin chute section 181 in the coin diverting or returning position indicated in Figure 7.

Another latch 294 is engageable with the latch arm 289 whenever no ticket material is present in the machine, thereby to assure return of a coin to a person seeking a weight indication bearing ticket when no such ticket is procurable. The latch 294 is secured upon a shaft 295 rockably mounted in the panel 159. The latch 294 is mounted at the rear face of the panel, and the shaft 295 extends forwardly through the panel and carries a weighted lever 296 which constantly tends to move the latch lever to the latch arm engaging position. See Figures 2 and 3. The lever 296 is normally held upwardly in a position for displacing the latch from engagement with the latch arm 289 by engagement of the weighted lever with and the supporting thereof by the ticket strip 297. The ticket strip is fed through a guideway 298 from a suitable magazine (not shown). When the ticket material becomes exhausted the weight 296 normally held up by the ticket strip gravitates, rocks the shaft 295 and engages the latch 294 over the arm 289, thereby preventing displacement of the chute section 181 from its coin return position illustrated in Figure 7.

The coin chute proper 241 into which the tiltable coin chute section 181 delivers, includes a tortuous passage or a coin fall delaying section 300, and normally delivers at its lower end into the coin discharge passage 243, the coin falling laterally off the end of the coin depressed release lever 96 at 240.

In Figure 14 of the drawings, I have illustrated a slightly modified means for providing the slot or kerf in the rotor flange 194. In this modified form of the invention, the kerf is formed in a sector 301 which is adjustably mounted, as at 302, on the rotor. By utilizing an adjustably mounted kerf-equipped sector, alignment of the kerfs 195 and 207 in the respective rotors is greatly facilitated in the initial setting up of the machine. It will be observed by reference to Figure 14 that the rotor 192a is in this instance provided with an enlarged flange opening 303 and by adjustment of the position of the sector 301, the position of the kerf 195a in the sector can be altered at will with relation to said enlarged opening 303.

By reason of the provision of the novel coin pitching equipment hereinbefore described, coins legitimately deposited through the coin slot 155 are pitched across the coin returning and debris receiving chute 173 by the sudden drawing together of the levers 166 against the trailing edge of the coin by the spring 170, but any paper bits or other debris inserted through the coin slot will fall into the chute 173 and be delivered into the receptacle 158 without clogging or in any wise interfering with proper operation of the mechanisms of the scale.

A person using the improved scale structure herein disclosed can, by manipulation of the knob 219, adjust the dial plate 203 to record or indicate his guess of his weight. It will be remembered that upon mounting the platform 151, the plunger 40 is lifted to store energy in the spring 93, the latch 130 which holds the release lever 96 against depression is removed from its holding position, the lift lever extension 248 is lowered to assure the normal vertical or non-diverting position of the vane 238, and the racks 37 and 256 are lifted to record the weight on the platform and position the printing wheel and the rotor 192 to indicate or record said weight.

Upon depositing of a coin, assuming that the plunger 40 has been elevated the full distance desirable to properly store energy in the spring 93 and sufficient to displace the weighted lever 284 and the latch portion 288 thereof so as to permit the chute section 181 to move into coin and slot registering position, said coin will fall through the coin chute and depress the lever 96, thereby releasing the member 103 and permitting the member 105 to forcibly engage and release the latch or trigger 95 to thereby permit the spring 93 to actuate the printing hammer and the ticket cut-off knife.

As the crank arm 232 moves downwardly upon actuation of the hammer and knife equipments, the support 229 is removed from beneath the flange 227 of the lever 221, and the lever is free to be moved downwardly by the spring 228 unless such downward movement is obstructed by the projecting end of the plunger 225. Downward movement of the lever will be so obstructed unless the person using the scale has accurately guessed his weight, thereby occasioning perfect registry of the rotor sections 207 and 195 and permitting the movement of the outer end of the bar 208 from the kerf 207 into the kerf 195, thereby freeing the front end of the plunger 225. Whenever the plunger 225 is so freed, the lever 221 snaps downwardly and lifts the rod 234, thereby positioning the vane 238 for extending into the coin slotway 243 to divert the coin and deliver it over the surfaces 244 and 245 into the coin return chute portion 175.

Movement of the lever 105 also releases the pawl 43 and allows the plunger to descend and reset the printing hammer and cutting knife equipments. Resetting of these equipments moves the crank arm 232 upwardly and causes the abutment 229 to reset the lever 221 to the normal position first described. Downward movement of the plunger also brings about engagement between the elements 293 and 292, causing the rock shaft 183 to be latched by the member 288 in position for tilting the coin slot section 181 to the coin returning position.

It will be obvious that various changes and modifications can be made in the structures herein disclosed without departing from the spirit and scope of the invention as defined in the appended claims.

I claim:

1. In a weighing scale, weighing means, an element manually movable for indicating a guess of a weight imposed upon the weighing means and having a recess therein, a second element movable with the weighing means for indicating the weight imposed upon the weighing means and having a recess therein, coin controlled means for ascertaining the result of the weighing operation, and means operable only when the element recesses are brought into registry by coincidence of the weight guess and actual weight indications for returning a coin to a user of the scale.

2. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, coin controlled means for ascertaining the result of the weighing operation, and means operable only when the rotor recesses are brought into registry by coincidence of the weight guess and actual weight indications for returning a coin to a user of the scale.

3. In a weighing scale, weighing means, an element manually movable for indicating a guess of a weight imposed upon the weighing means and having a recess therein, a second element movable with the weighing means for indicating the weight imposed upon the weighing means and having a recess therein, coin controlled means for ascertaining the result of the weighing operation, and means operable only when the element recesses are brought into registry by coincidence of the weight guess and actual weight indications for returning a coin to a user of the scale, said last named means including a movement obstructing member carried by one element and lying in the recess thereof and displaceable only when the recesses are brought into registry.

4. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, coin controlled means for ascertaining the result of the weighing operation, and means operable only when the rotor recesses are brought into registry by coincidence of the weight guess and actual weight indications for returning a coin to a user of the scale, said last named means including a movement obstructing element carried by one rotor and displaceable only when the recesses are brought into registry.

5. In a weighing scale, weighing means, an element manually movable for indicating a guess of a weight imposed upon the weighing means and having a recess therein, a second element movable with the weighing means for indicating the weight imposed upon the weighing means and having a recess therein, coin controlled means for ascertaining the result of the weighing operation, a movement obstructing member carried by one element and lying in the recess thereof and displaceable from its movement obstructing position only when the recess of the other element is brought into position to receive said obstructing member by coincidence of the weight guess and actual weight indications, and spring actuated means operable upon displacement of the movement obstructing member for effecting the return of a coin to a user of the scale.

6. In a weighing scale, weighing means, an element manually movable for indicating a guess of a weight imposed upon the weighing means and having a recess therein, a second element movable with the weighing means for indicating the weight imposed upon the weighing means and having a recess therein, coin controlled means for ascertaining the result of the weighing operation, a movement obstructing member carried by one element and lying in the recess thereof and displaceable from its movement obstructing position only when the recess of the other element is brought into position to receive said obstructing member by coincidence of the weight guess and actual weight indications, coin controlled means for printing and dispensing a ticket evidencing the weight imposed upon the weighing means, spring actuated means operable upon displacement of the movement obstructing member for effecting the return of a coin to a user of the scale, means for restoring the printing and dispensing means to normal following each operation thereof, and means actuated by the restoration of said printing and dispensing means for restoring said spring actuated means to normal.

7. In a weighing scale, weighing means, an element manually movable for indicating a guess of a weight imposed upon the weighing means and having a recess therein, a second element movable with the weighing means for indicating the weight imposed upon the weighing means and having a recess therein, coin controlled means for ascertaining the result of the weighing operation, means operable only when the element recesses are brought into registry by coincidence of the weight guess and actual weight indications for returning a coin to a user of the scale, said last named means including a movement obstructing member carried by one element and lying in the recess thereof and displaceable only when the recesses are brought into registry, and means for adjusting the position of one said rotor recess to alter the normal relation of said recesses.

8. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, a coin chute, a return chute, coin controlled means for ascertaining the result of the weighing operation, means operable only when the rotor recesses are brought into registry by coincidence of the weight guess and actual weight indications for returning a coin to a user of the scale, said last named means including a movement obstructing lever pivoted intermediate its ends on and disposed radially of said first mentioned rotor with its inner end overlying the rotor axis and its outer end normally within the rotor recess, a movement obstructing plunger reciprocable axially through the second rotor and engaging the inner end of the lever and free to move axially only when the outer end of the lever moves into the recess of the second rotor, and means movable each time the plunger is thus freed to divert a coin from the coin chute and direct it into said return chute.

9. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, a coin chute, a return chute, coin controlled means for ascertaining the result of the weighing operation, means operable only when the rotor recesses are brought into registry by coincidence of the weight guess and actual weight indications for returning a coin to a user of the scale, said last named means including a movement obstructing lever pivoted intermediate its ends on and disposed radially of said first mentioned rotor with its inner end overlying the rotor axis and its outer end normally within the rotor recess, a movement obstructing plunger reciprocable axially through the second rotor and engaging the inner end of the lever and free to move axially only when the outer end of the lever moves into the recess of the second rotor, means movable each time the plunger is thus freed to divert a coin from the coin chute and direct it into said return chute, and including a pivotally mounted diverter vane and crank means for controlling its position, and means movable with the weighing means and engageable with said crank means for yieldably holding the vane in either of its normal or coin diverting positions.

10. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, a coin chute, a return chute, coin controlled means for ascertaining the result of the weighing operation, means operable only when the rotor recesses are brought into registry by coincidence of the weight guess and actual weight indications for returning a coin to a user of the scale, said last named means including a movement obstructing lever pivoted intermediate its ends on and disposed radially of said first mentioned rotor with its inner end overlying the rotor axis and its outer end normally within the rotor recess, a movement obstructing plunger reciprocable axially through the second rotor and engaging the inner end of the lever and free to move axially only when the outer end of the lever moves into the recess of the second rotor, means movable each time the plunger is thus freed to divert a coin from the coin chute and direct it into said return chute, and including a pivotally mounted diverter vane and crank means for controlling its position, a pivoted spring depressed actuator lever depression of which is obstructed by said plunger, and means connecting the lever with the crank means for shifting the vane to the coin diverting position each time the plunger is released.

11. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, a coin chute, a return chute, means for printing a weighth imposed upon the weighing means, coin controlled means for dispensing the printed evidence of the weight imposed upon the weighing means, means operable only when the rotor recesses are brought into registry by coincidence of the weight guess and actual weight indications for returning a coin to a user of the scale, said last named means including a movement obstructing lever pivoted intermediate its ends on and disposed radially of said first mentioned rotor with its inner end overlying the rotor axis and its outer end normally within the rotor recess, a movement obstructing plunger reciprocable axially through the second rotor and engaging the inner end of the lever and free to move axially only when the outer end of the lever moves into the recess of the second rotor, means movable each time the plunger is thus freed to divert a coin from the coin chute and direct it into said return chute, and including a pivotally mounted diverter vane and crank means for controlling its position, a pivoted spring depressed actuator lever depression of which is obstructed by said plunger, means connecting the lever with the crank means for shifting the vane to the coin diverting position each time the plunger is released, means for restoring the printing means to normal following each weighing operation, means actuated by restoration of said printing means for returning the actuator lever to normal, and means actuated by the weighing means and engageable with said crank means for moving the vane to normal following each coin diverting function thereof.

12. In a weighing scale, weighing means, a rotor manually movable for indicating a guess of a weight imposed upon the weighing means and having a recess therein, a second rotor movable with the weighing means for indicating the weight imposed upon the weighing means and having a recess therein, said rotors being disposed in axial alignment, a coin chute, a return chute, means for printing a weight imposed upon the weighing means, coin controlled means for dispensing the printed evidence of the weight imposed upon the weighing means, means operable only when the rotor recesses are brought into registry by coincidence of the weight guess and actual weight indications for returning a coin to a user of the scale, said last named means including a movement obstructing lever pivoted intermediate its ends on and disposed radially of said first mentioned rotor with its inner end overlying the rotor axis and its outer end normally within the rotor recess, a movement obstructing plunger reciprocable axially through the second rotor and engaging the inner end of the lever and free to move axially only when the outer end of the lever moves into the recess of the second rotor, means movable each time the plunger is thus freed to divert a coin from the coin chute and direct it into said return chute, and including a pivotally mounted diverter vane and crank means for controlling its position, a pivoted spring depressed actuator lever depression of which is obstructed by said plunger, means connecting the lever with the crank means for shifting the vane to the coin diverting position each time the plunger is released, means for restoring the printing means to normal following each weighing operation, means actuated by restoration of said printing means for returning the actuator lever to normal, and means actuated by the weighing means and engageable with said crank means for moving the vane to normal following each coin diverting function thereof and including a spring urged cam finger engageable with the crank means and effective during each weighing operation to yieldably hold the vane in one or the other of its normal or coin diverting positions.

VINCENT F. SLEZAK.